July 26, 1960 A. SERAGNOLI 2,946,425
MECHANISM FOR DISTRIBUTING AND FEEDING ARTICLES INTO A MACHINE
Filed Dec. 27, 1956 4 Sheets-Sheet 3

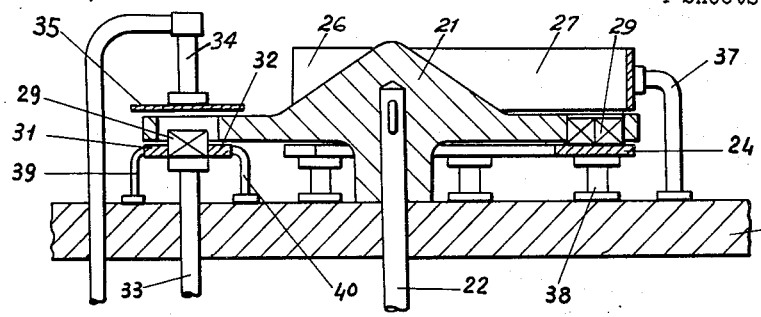
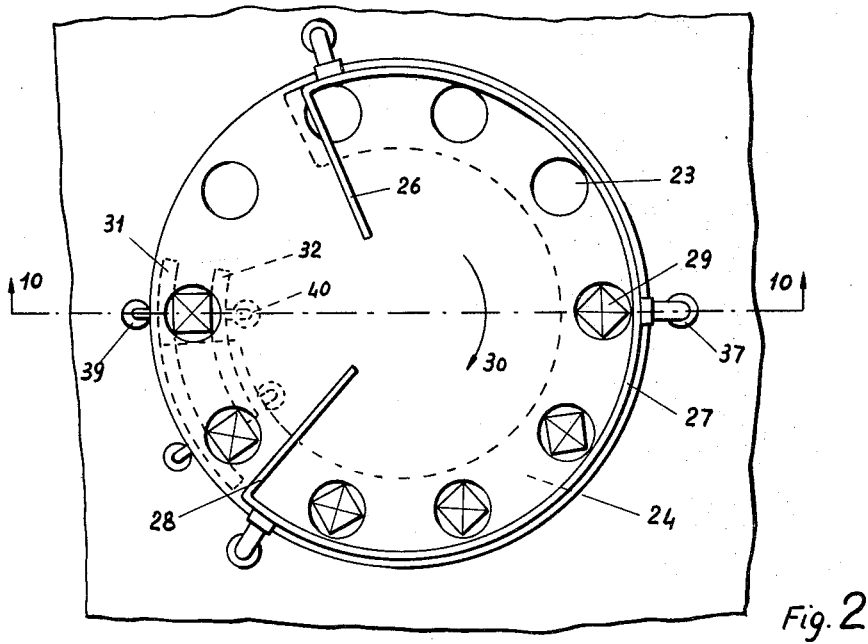
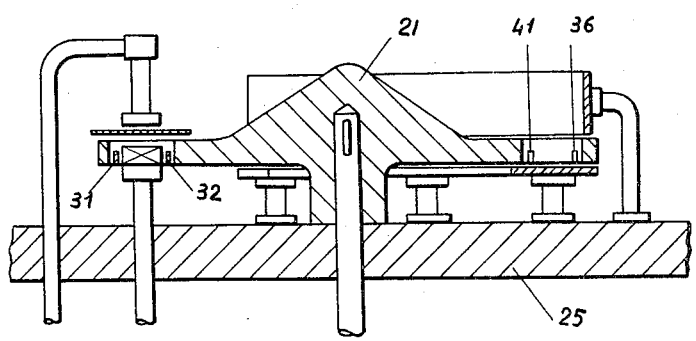

INVENTOR
ARIOSTO SERAGNOLI
BY
Watson, Cole, Grindle + Watson
ATTORNEYS

July 26, 1960 A. SERAGNOLI 2,946,425
MECHANISM FOR DISTRIBUTING AND FEEDING ARTICLES INTO A MACHINE
Filed Dec. 27, 1956 4 Sheets-Sheet 4

INVENTOR
ARIOSTO SERAGNOLI
BY
Watson, Cole, Grindle & Watson
ATTORNEYS

2,946,425
MECHANISM FOR DISTRIBUTING AND FEEDING ARTICLES INTO A MACHINE

Ariosto Seragnoli, 10 Via Pomponia, Bologna, Italy

Filed Dec. 27, 1956, Ser. No. 630,859

Claims priority, application Italy Dec. 30, 1955

10 Claims. (Cl. 198—30)

Various types of mechanisms for distributing and feeding, one at a time, into a machine articles having substantially a square, rectangular and the like shape, for instance, the feeding of square-shaped caramels into a wrapping machine, are already known. Inter alia, there are known mechanisms comprising discs or other conveying means, in which bottomless holes are provided of such a shape as to correspond to the shape of the articles to be placed therein, each of these holes being intended to receive an article, which is carried by supports arranged below, and to deliver it to the feeding members.

In said devices, rectangular articles, owing to their shape, cannot easily enter the holes and properly place themselves therein, to which holes they should exactly conform in shape and orientation, so that it is impossible for the articles to be properly and quickly distributed and fed into a machine.

These drawbacks are removed by the present invention which relates to a mechanism for distributing and feeding, one at a time, into a machine articles of a square, rectangular or the like shape.

The present invention comprises a conveying disc provided with bottomless holes within which the articles to be distributed are placed, and a supporting surface arranged below the holes to hold the articles therein. The latter have a circular section so that the arrangement of the articles therein does not depend upon their orientation. This is much easier than using shaped holes, whatever method is used to cause the articles initially to enter the holes. Orientation of the articles for subsequent feeding into a machine is obtained by causing them to rotate around the axis of said holes until properly orientated.

Accordingly the primary object of the present invention is to provide a machine which will orientate square and rectangular shaped objects fed into it and deliver them with a predetermined orientation to a wrapping or other machine.

A preferred form of the invention for automatically distributing and feeding square-shaped caramels into a wrapping machine will now be disclosed merely by way of illustration, without any limitation, having reference to the annexed drawings in which:

Fig. 1 is a vertical section according to plane 10—10 of Fig. 2;

Fig. 2 is a plan view towards the lower part of Fig. 1, upon having removed the elements 34 and 35;

Fig. 3 is a vertical section of an alternative form of the invention;

Figure 4:
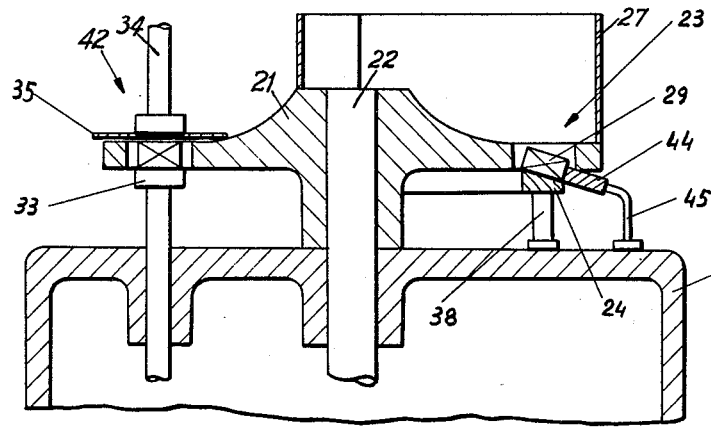
Fig. 4 shows another alternate form of the invention in a diagrammatic vertical section according to line 11—11 of Fig. 5.

According to the embodiment shown in Figures 1 and 2, the mechanism comprises a disc 21, with vertical axis, carried by shaft 22, which is caused to intermittently rotate in the direction of arrow 30 by means of any mechanism of well known type, which for simplicity's sake is not shown in the figures. Shaft 22 is guided in the stationary base 25.

The disc 21 is raised in the centre and provided on the periphery with a plurality of bottomless holes 23 of equal distance from shaft 22 having a circular section, which are each of such size so as to receive therein a square-shaped caramel; thus, the diameter of said holes corresponds to the diagonal length of the caramel and the height of said holes corresponds to the height of said caramel.

Below the holes 23 supporting surface 24 secured by supports 38 to the base 25 is provided, upon which bear and slide the caramels 29 which have been able to enter a hole 23.

Above the disc 21 means are provided which, by cooperating with the raised central portion of disc 21, define a supply and distributing enclosure and an external area for orienting and removing the caramels from the holes 23. Said means comprise an inlet fence 26, an outlet fence 28, and a side fence 27 substantially concentric with shaft 22, which elements are secured to base 25 by means of supports 37.

The lower edge of outlet fence 28 pushes back the caramels which have been unable to enter holes 23 in order to avoid breaking them. Said edge is preferably provided with a yieldable border, such as rubber, not shown in Figs. 1 to 3, but diagrammatically indicated at 43 in Figs. 5 and 7. The caramels are fed onto disc 21 near the center thereof and within the distributing enclosure formed by fences 26, 27 and 28 so that, owing to the slope of the raised portion at the center of disc 21 and centrifugal force, they shortly move out to the edge of disc 21 and easily work themselves into holes 23, since they need not assume a particular position in order to do so.

The caramels, which have been able to locate themselves within the holes 23, pass beneath the outlet fence 28 and reach the outer orientating and removing area 42, whereas those, which have been unable to place themselves into the said holes, are pushed back by fence 28 and are left within the supply and distributing enclosure 27 until in time they are able to locate themselves within one of the subsequent holes 23.

During its intermittent movement in the direction of arrow 30, the disc 21, upon having subsequently moved one after the other the holes 23 containing the caramels 29, causes them to abandon the enclosure and to reach the external orientating and removing area 42.

In said area, immediately outside the fence 28, the supporting surface 24 is arranged somewhat lower in the other parts, so that the caramels 29 project beneath the disc 21 (see Figure 1) and are caused to undergo the action of the orientating means composed of the stationary guides 31 and 32 which form an annular channel situated between the guides 24 and the disc 21. The guides 31, 32 are carried by the supports 39, 40 secured to the base 25.

When a caramel 29 hits with its edge against the front end of guide 31, it will be orientated by this guide, so as to locate itself parallel to said guide; subsequently, the caramel enters also guide 32 which keeps it positioned within the round hole so that two sides are parallel to a radius and other two sides are parallel to a tangent.

Upon continuing its intermittent movement, the disc 21 causes the holes with the caramels to rest in a station for removing the caramels and feeding them into a machine, in which station the supporting surface 24 is discontinued to permit a lower removing means or elevator 33 to receive the caramel in cooperation with a counter-elevator 34 above, both of which are guided within the base 25.

Feeding means of the usual type, not shown in the drawings, convey above the caramel 29 a small piece of wrapping paper 35; subsequently, during the phase of rest of the disc, the counter-elevator 34 and the elevator 33 grip the caramel 29 exactly positioned because of the action of guides 31 and 32, as well as the piece of paper 35 located above, and deliver the whole to a wrapping machine.

Subsequently, the counter-elevator and the elevator move back into the position of Fig. 1, when a new cycle starts.

In the alternative form of the invention shown in Fig. 3 the disc 21 has in the lower part two grooves 36, 41 concentric with the axis of rotation of said disc and into which, in the orientating area, the orientating guides 31, 32 are located; in this way, it will be unnecessary to place in said area the supporting surface 24 in a lower position than in the other areas. In Fig. 3 the right hand hole is shown empty to show more clearly grooves 36, 41.

In the remaining two alternate forms of the invention shown in Figures 4 to 7, the upper face of the supporting surface 24 is cone-shaped and sloping towards the outside, except for the portion in the immediate neighbourhood of the removal area 42, where the upper face of the supporting surface 24 blends upward into a surface parallel and tangent to the lower plane of the disc 21. The latter surface is not visible in the figures. A separator 43, such as a brush or a yieldable edge of rubber, is secured to the outlet fence 28 to push back the articles which have not been able to enter the holes.

In order to move the caramels towards the removal station always with the same orientation, they are acted upon by a stationary alignment guide 44 secured to base 25 by means of supports 45, on which the caramels slide owing to the slope of supporting surface 24.

Figure 5:
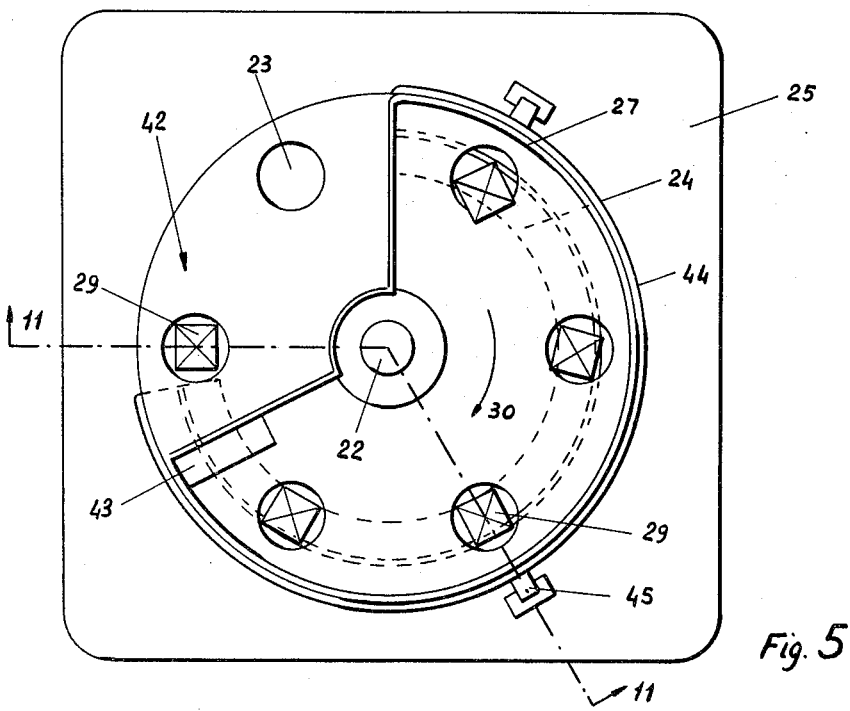
Fig. 5 is a diagrammatic partial plan view towards the lower part of the mechanism of the form of the invention shown in Fig. 4.
Figure 7:
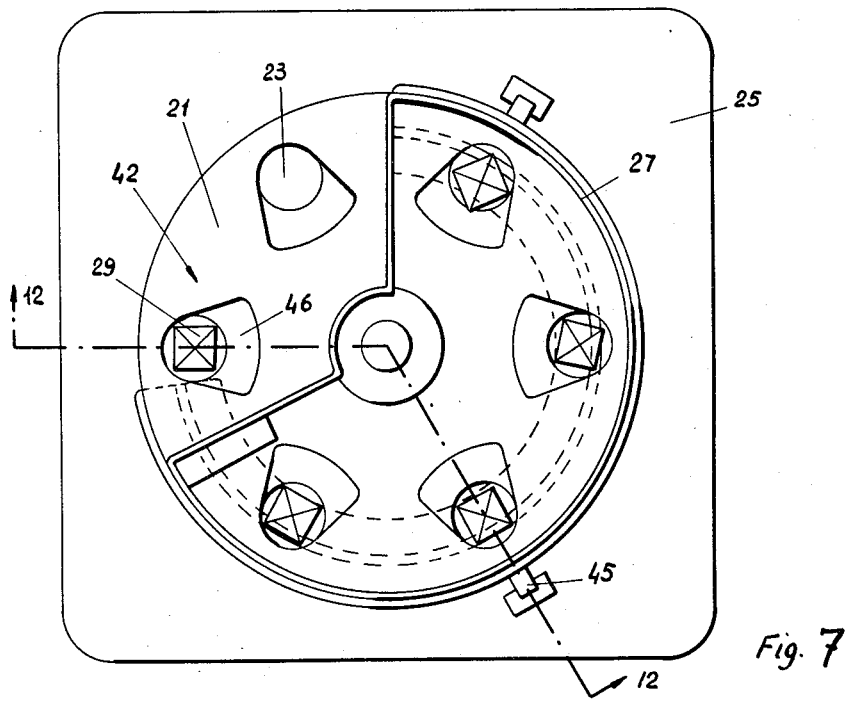
Fig. 7 is a diagrammatic partial plan view towards the lower part of a modification of the form of the invention shown in Figs. 4 and 5.

In operation, the disc 21 intermittently rotates with a series of shocks which cause the square-shaped caramels to fall into the round holes in indiscriminate position, as shown, for instance, in the holes 23 adjacent to the inlet fence 26 in Figures 5 and 7. During the subsequent shocks and forward movements a caramel 29 in one of holes 23, whose outer edge frictionally slides on the edge of the alignment guide 44, is gradually reorientated by the action of its weight and centrifugal force (see Figures 5 and 7) to its final position, in which the caramel bears with one side against the alignment guide 44, prior to reaching the outlet fence 28.

Upon having reached this orientation, the caramel no longer rotates with respect to the hole, which it has wholly entered.

The forward movement of disc 21 causes the caramel to pass below separator 43 and to reach the removal area 42 where it stops above the elevator 33 provided at an interruption of the supporting surface 24. Thereupon follow the already disclosed operations for removing the caramel from the hole and delivering the same to a wrapping machine.

Figure 6:
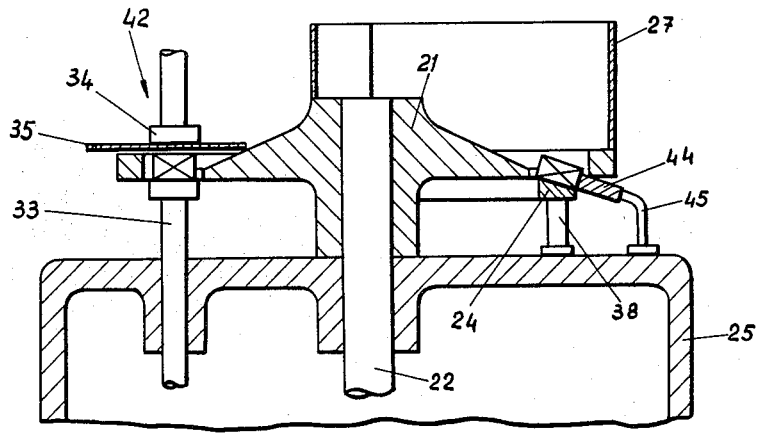
Fig. 6 is a diagrammatic vertical section, according to line 12—12 of Fig. 7.
Figure 8:
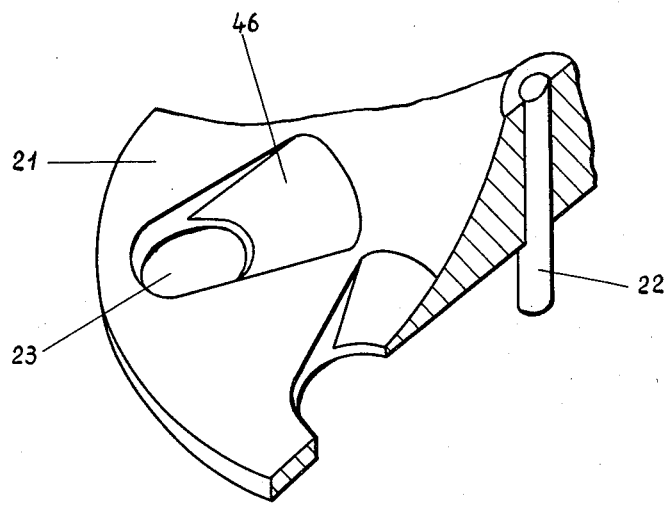
Fig. 8 is a perspective view of a detail of Fig. 7.

In the modification illustrated in Figures 6, 7 and 8, the holes 23 are flared towards the centre of disc 21 in area 46.

This expansion, as shown in said figures, facilitates the introduction and the proper orientation of the square-shaped caramel within the holes 23.

Of course, the feeding mechanism may undergo many modifications, without thereby departing from the scope of the present invention. The essence of the invention is a conveying disc of any type provided with holes having a round section, each of which is intended to receive an article of square, rectangular or the like shape without any necessary orientation of its sides; reorientating guides arranged below the holes which act upon the article during movement of the latter by rotation of the disc, cause it thereby to be reorientated within the hole to a prescribed position and advance it to a point where it is removed from the holes and fed into a wrapping machine.

The appended claims are intended to cover all of those variations and modifications the mechanism is likely to undergo and which fall within the purpose and the spirit of the invention; for instance the arrangement of the articles within the holes of the conveying means can be performed by automatic or manual or both automatic and manual movement of the disc; the sides of the articles may also be somewhat curvilinear; the supporting surface 24 and the guide 44 can be formed from only one piece.

What I claim is:

1. A device for orientating and feeding rectangular-shaped objects into a machine comprising a disc mounted substantially horizontally for axial rotation about its center and provided with a plurality of circular holes there-through spaced about its periphery at equal radii from said axis, said holes being of sufficient diameter to encompass there-within the objects to be orientated and fed into a machine, means for intermittently rotating said disc in one direction about said axis, enclosure means fixedly mounted immediately above said disc encompassing a number of said holes and a portion of the upper surface of said disc, whereby a distributing area is formed upon said disc, means supplying said distributing area with objects to be orientated and fed into a machine, a fixed supporting surface positioned immediately below the path described by said holes during rotations of said disc and extending in the direction of rotation of said disc from the entrance of said holes into said distributing area to an end beyond their exit therefrom, whereby such objects as have entered said holes from said distributing area during rotations of said disc are supported there-within, an orientating guide having an orientating surface concentric with the path described by the axes of said holes during rotations of said disc fixedly positioned around one side of said supporting surface and extending between the latter and said disc so that objects in said holes slidably bear against said supporting surface and said orientating surface during rotation of said disc above said supporting surface, whereby such objects are orientated by cooperation between said holes and said orientating surface, and removal means positioned at said end of said supporting surface and operable in cooperation with said rotating means to remove the orientated objects from said holes during the intermittent pauses between rotations of said disc.

2. The device of claim 1 wherein said disc is provided on its upper surface about said axis with a raised portion sloping from said axis toward the periphery of said disc, and wherein said enclosure means comprises a fence fixedly mounted immediately above said disc, said fence having an arcuate portion along a portion of the periphery of said disc positioned between said holes and the circumferential edge of said disc and end portions projecting inwardly from said arcuate portion toward the axis of said disc, whereby said fence encompasses a number of said holes and a portion of the upper surface of said disc and comprises a distributing area upon said disc.

3. A device for introducing and aligning angular bodies in a wrapping machine, comprising a movable conveying plate with open circular pockets each adapted to receive one of the bodies to be introduced, a bearing means provided below the plate and on which the bodies rest in the pockets, a stationary lateral orientating guide provided underneath the plate, the bodies with their side surface abutting against the orientating guide and are thus aligned parallel to the conveying direction.

4. A device according to claim 3, in which the bearing means within the area of the orientating guide with respect to the conveying plate has such an interval configuration that between the conveying plate and the supporting means the lateral orientating guide is permitted to accommodate the bodies, said orientating guide aligning the bodies to be distributed in a position parallel to the conveying direction.

5. A device according to claim 3, in which the conveying plate on its lower bottom surface is provided with grooves extending parallel to the conveying direction of the bodies and into which the orientating guide engages.

6. A device according to claim 3, in which the bearing means is stationary and shaped with a sliding surface for the bodies in the pockets.

7. A device according to claim 3, in which the conveying plate is shaped as a rotating disc and a circular bearing means so that the bearing surface is radially inclined outwardly and on its external side, and in which an orientating ring is provided against which the bodies that have entered the pockets are pressed and forced to adhere so as to be aligned with one lateral surface parallel to said ring.

8. A device according to claim 3, in which the conveying plate is formed as a rotary disc with the pockets provided on the periphery of the disc.

9. A device according to claim 3, in which the conveying plate is formed as a rotary disc with the pockets provided on the periphery of the disc, and in which the upper surface of the conveying plate directly to the pockets are provided with cavities which extends towards the center of the disc and have a bottom surface ascending in this direction.

10. A device according to claim 3, in which a frame is provided above the conveying disc on its periphery which limits the filling chamber for the bodies to be distributed.

References Cited in the file of this patent

UNITED STATES PATENTS

| | | |
|---|---|---|
| 2,777,561 | Rose | Jan. 15, 1957 |
| 2,778,478 | Brook | Jan. 22, 1957 |

FOREIGN PATENTS

| | | |
|---|---|---|
| 706,731 | Great Britain | Apr. 7, 1954 |